(12) United States Patent
Lee

(10) Patent No.: US 11,506,781 B2
(45) Date of Patent: Nov. 22, 2022

(54) APPARATUS FOR CORRECTING ERROR OF RADAR SENSOR FOR VEHICLE AND METHOD THEREOF

(71) Applicants: HYUNDAI MOTOR COMPANY, Seoul (KR); KIA MOTORS CORPORATION, Seoul (KR)

(72) Inventor: Dong Ju Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 279 days.

(21) Appl. No.: 16/870,346

(22) Filed: May 8, 2020

(65) Prior Publication Data

US 2021/0132216 A1 May 6, 2021

(30) Foreign Application Priority Data

Nov. 6, 2019 (KR) .................. 10-2019-0141282

(51) Int. Cl.
*G01S 13/931* (2020.01)
*G01S 7/40* (2006.01)
*G01S 13/86* (2006.01)

(52) U.S. Cl.
CPC .......... *G01S 13/931* (2013.01); *G01S 7/4021* (2013.01); *G01S 13/867* (2013.01); *G01S 2013/93275* (2020.01)

(58) Field of Classification Search
CPC ............... G01S 13/867; G01S 13/931; G01S 2013/93275; G01S 7/4021; G01S 7/4026
See application file for complete search history.

(56) References Cited

U.S. PATENT DOCUMENTS

| 2004/0080449 | A1* | 4/2004 | Horibe ............... G01S 13/867 342/75 |
| 2017/0053533 | A1* | 2/2017 | Kuroda ............... B62D 15/021 |
| 2019/0113925 | A1* | 4/2019 | Sim ................. B60W 30/18163 |
| 2019/0120947 | A1  | 4/2019 | Wheeler et al. |

FOREIGN PATENT DOCUMENTS

KR    2019-0120947 A1    4/2019

* cited by examiner

*Primary Examiner* — Timothy X Pham
(74) *Attorney, Agent, or Firm* — Lempia Summerfield Katz LLC

(57) ABSTRACT

An apparatus for correcting an error of a radar sensor for a vehicle and a method thereof can correct a target measurement error of the radar sensor installed inside a bumper of the vehicle based on target information obtained from a camera image. The apparatus includes: a radar sensor that is installed inside a bumper of the vehicle to detect a target, a camera that photographs a surrounding image of the vehicle, and a controller that corrects a target detection error of the radar sensor based on target information obtained from an image photographed by the camera.

6 Claims, 10 Drawing Sheets

APPARATUS FOR CORRECTING ERROR OF RADAR SENSOR FOR VEHICLE AND METHOD THEREOF

CROSS-REFERENCE TO RELATED APPLICATION

This application claims priority to and the benefit of Korean Patent Application No. 10-2019-0141282, filed on Nov. 6, 2019, the entire contents of which are incorporated herein by reference.

FIELD

The present disclosure relates to a technique for correcting a target measurement (detection) error of a radar sensor for a vehicle.

BACKGROUND

The statements in this section merely provide background information related to the present disclosure and may not constitute prior art.

Recently, more vehicles are equipped with a radar sensor. An electronic controller of a vehicle may calculate a distance, a relative speed, and an angle between the vehicle and a target based on information obtained from the radar sensor installed on the vehicle.

A vehicle equipped with such a radar sensor may provide various safety functions or convenience functions using such a distance, a relative speed, and an angle between the vehicle and the target. For example, the collision avoidance function, the smart cruise function, or the auto parking function may be performed by determining the distance, the relative speed, and the angle between the vehicle and the target using information obtained from the radar sensor mounted on the vehicle.

As described above, because the function of the radar sensor in the vehicle is important, the reliability of the information obtained from the radar sensor is also important.

In general, the radar sensor for a vehicle is installed inside the bumper of the vehicle. We have discovered that a measurement error for a target may occur due to the difference in the angle of refraction of a target reflected wave due to the different between the bumper thicknesses of vehicles or the difference in the angle of refraction of the target reflected wave due to the deformation of the bumper surface.

In particular, we have found that when a target has a structure (e.g., a guardrail) capable of causing diffuse reflection of a radar electromagnetic wave, the possibility of causing a measurement error in the position and angle of the target is further increased.

According to a conventional technique of correcting an error of a radar sensor for a vehicle, there has been disclosed a configuration of acquiring image information around a vehicle by using a camera, analyzing vanishing point information included in the image information, and correcting a vertical scan angle of the radar sensor for a vehicle by using the analysis result of the vanishing point information.

This is a technique for correcting the error of the vertical angle that occurs out of the initially installed orientation angle due to an impact while driving, but any configurations for correcting the refraction angle of a reflected wave have not been disclosed.

The matters described in this background section are intended to promote an understanding of the background of the disclosure and may include matters that are not already known to those of ordinary skill in in the art.

SUMMARY

An aspect of the present disclosure provides an apparatus for correcting an error of a radar sensor for a vehicle and a method thereof which can correct a target measurement error of the radar sensor installed inside a bumper of the vehicle based on target information obtained from a camera image such that the target measurement error of the radar sensor caused due to different bumper thicknesses or deformation of a bumper surface is corrected.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for correcting an error of a radar sensor for a vehicle includes: a radar sensor that is installed inside a bumper of the vehicle to detect a target, a camera that photographs a surrounding image of the vehicle, and a controller that corrects a target detection error of the radar sensor based on target information obtained from an image photographed by the camera.

The controller may correct the target detection error of the radar sensor based on guardrail information obtained from the image photographed by the camera. The guardrail information may include a shape of a guardrail and a separation distance from the guardrail.

The controller may compare a shape of a first guardrail and a separation distance from the first guardrail obtained from the image photographed by the camera with a shape of a second guardrail and a separation distance from the second guardrail detected by the radar sensor to determine whether the first and second guardrails are the same.

The controller may correct the target detection error of the radar sensor based on an angle between the first guardrail and the second guardrail which are generated by matching a position of the first guardrail obtained from the image photographed by the camera with a position of the second guardrail detected by the radar sensor.

According to another aspect of the present disclosure, a method of correcting an error of a radar sensor for a vehicle includes: detecting a target by a radar sensor installed inside a bumper of the vehicle; photographing, by a camera, a surrounding image of the vehicle; and correcting, by a controller, a target detection error of the radar sensor based on target information obtained from the surrounding image photographed by the camera.

The correcting of the target detection error of the radar sensor may include: detecting guardrail information in the surrounding image photographed by the camera; and correcting the target detection error of the radar sensor based on the detected guardrail information. The guardrail information may include a shape of a first guardrail and a separation distance from the first guardrail.

The correcting of the target detection error of the radar sensor may include: matching a position of the first guardrail obtained from the surrounding image photographed by the camera with a position of a second guardrail detected by the radar sensor, and correcting the target detection error of the radar sensor based on an angle between the first and second guardrails.

The correcting of the target detection error of the radar sensor may include: comparing, by the controller, the shape of the first guardrail and the separation distance from the first guardrail obtained from the surrounding image photographed by the camera with a shape of the second guardrail and a separation distance from the second guardrail detected by the radar sensor to determine whether the first and second guardrails are the same.

According to still another aspect of the present disclosure, an apparatus for correcting an error of a radar sensor for a vehicle includes: a radar sensor that is installed inside a bumper of the vehicle to measure a shape of a first guardrail and a separation distance from the first guardrail, a camera that is installed on the vehicle to photograph an image including a second guardrail, and a controller that corrects a detection error of the radar sensor based on an angle between the first guardrail and the second guardrail which are generated by matching a position of the second guardrail obtained from the image photographed by the camera with a position of the first guardrail detected by the radar sensor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
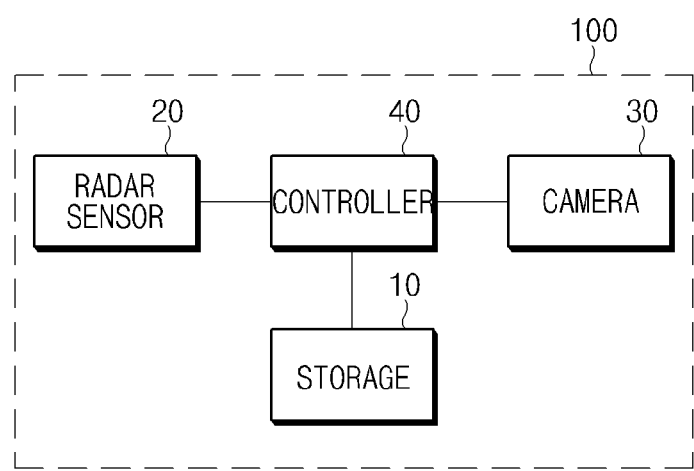
FIG. 1 is a block diagram illustrating an apparatus for correcting an error of a radar sensor for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary forms of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating an apparatus for correcting an error of a radar sensor for a vehicle according to one form of the present disclosure.

As shown in FIG. 1, an apparatus 100 for correcting an error of a radar sensor for a vehicle may include: a storage 10, a radar sensor 20, a camera 30, and a controller 40. In this case, according to a scheme of implementing the apparatus 100 for correcting an error of a radar sensor for a vehicle in one form of the present disclosure, each component may be combined with each other to be implemented as one, and some components may be omitted.

Regarding each component, first, the storage 10 may store various logic, algorithms and programs desired in a process of correcting a target measurement error of the radar sensor 20 based on target information obtained from an image photographed by the camera 30.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

The radar sensor 20 may be installed inside a bumper (a front or rear bumper) of a vehicle to detect various targets and may measure a position of the detected target and a separation distance from the target. For example, the radar sensor 20 may detect a guardrail as a target on a road on which the vehicle is driving, and measure a position of the guardrail and a separation distance from the guardrail.

Because the radar sensor 20 is installed inside a bumper of a vehicle, it is possible to apply a parameter for correcting the angle of refraction caused by the bumper (e.g., a bumper profile, a thickness of the bumper or the like) of the vehicle. As shown in FIGS. 2B and 2C, when the bumper is deformed, the correction by the parameter has no effect.

Figure 2A:
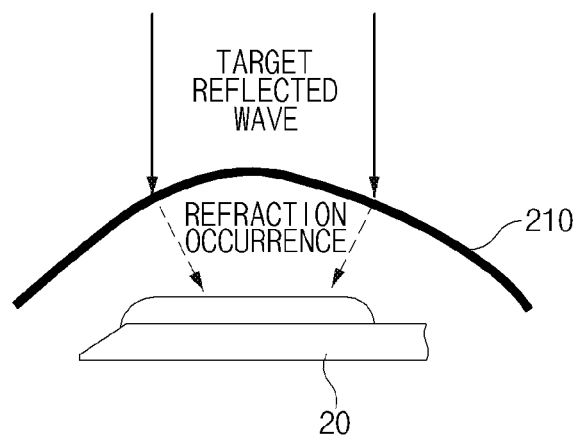
FIG. 2A is a view illustrating a state in which a radar sensor provided in an apparatus for correcting an error of a radar sensor for a vehicle is installed inside a normal bumper.
Figure 2B:
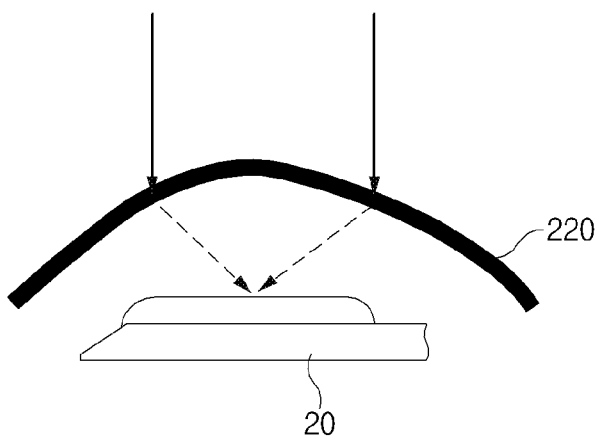
FIG. 2B is a view illustrating a state in which a radar sensor provided in an apparatus for correcting an error of a radar sensor for a vehicle is installed inside an abnormal bumper.
Figure 2C:
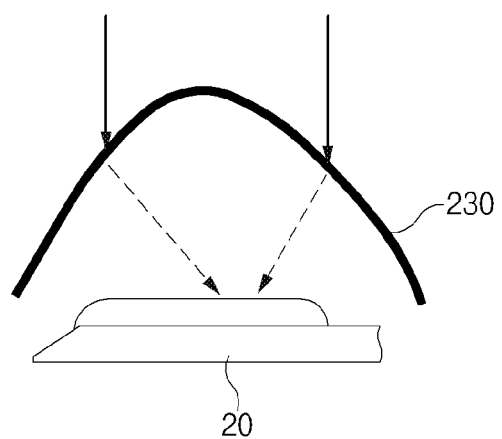
FIG. 2C is a view illustrating a state in which a radar sensor provided in an apparatus for correcting an error of a radar sensor for a vehicle is installed inside an abnormal bumper.

FIG. 2A is a view illustrating a state in which a radar sensor provided in an apparatus for correcting an error of a radar sensor for a vehicle according to one form of the present disclosure is installed inside a normal bumper.

As shown in FIG. 2A, because the thickness of the bumper 210 in which the radar sensor 20 is installed is normal, the refraction angle of a target reflected wave input to the radar sensor 20 may be normally corrected by a preset parameter (a reference parameter uniformly applied to the same vehicle model).

FIG. 2B is a view illustrating a state in which a radar sensor provided in an apparatus for correcting an error of a radar sensor for a vehicle according to one form of the present disclosure is installed inside an abnormal bumper.

As shown in FIG. 2B, it may be understood that the thickness of an abnormal bumper 220 is thicker than that of a normal bumper 210, so that the refraction angle of the target reflected wave is changed when compared with the normal refraction angle shown in FIG. 2A. In this case, even if a reference parameter is applied, the measurement error of the radar sensor 20 may not be corrected normally.

Therefore, the apparatus 100 for correcting an error of a radar sensor for a vehicle according to one form of the present disclosure must operate to correct the measurement error of the radar sensor 20 normally.

FIG. 2C is a view illustrating a state in which a radar sensor provided in an apparatus for correcting an error of a radar sensor for a vehicle according to one form of the present disclosure is installed inside an abnormal bumper.

As shown in FIG. 2C, an abnormal bumper 230 is deformed compared to the normal bumper 210, so that the refraction angle of the target reflected wave is different from the normal refraction angle shown in FIG. 2A. In this case, even if a reference parameter is applied, the measurement error of the radar sensor 20 may not be corrected normally.

Therefore, the apparatus 100 for correcting an error of a radar sensor for a vehicle according to an form of the present disclosure must operate to correct the measurement error of the radar sensor 20 normally.

The camera 30, which is a module installed in a vehicle, may include a front camera that photographs the front image of the vehicle, and a rear camera that photographs the rear image of the vehicle.

The controller 40 performs the overall control such that each component can perform its functions normally. The controller 40 may be implemented in the form of hardware, in the form of software, or in a combination of hardware and software. In one form, the controller 40 may be implemented as a microprocessor, but is not limited thereto.

In particular, the controller 40 may perform various controls desired in the operations of correcting the target measurement error of the radar sensor 20 installed inside the bumper of the vehicle based on the target information obtained from the image photographed by the camera 30.

Hereinafter, the operation of the controller 40 will be described in detail with reference to FIGS. 3 to 6.

Figure 3:
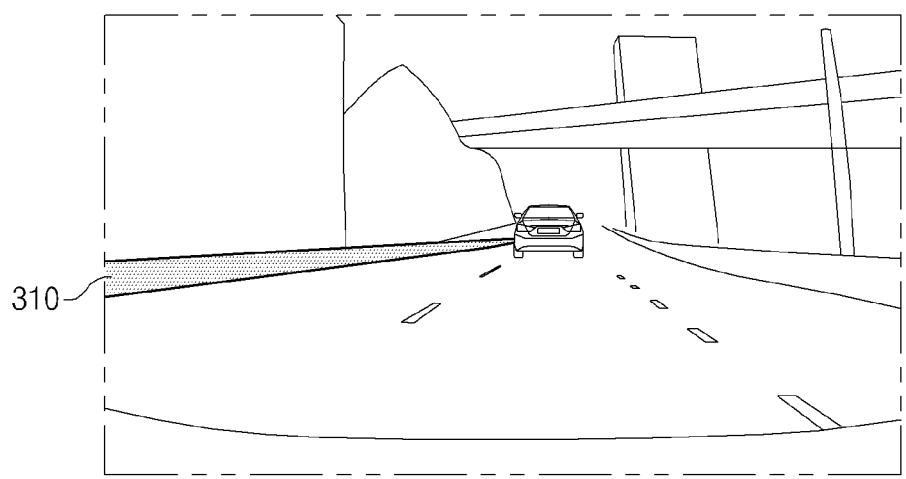
FIG. 3 is a view illustrating a front image of a vehicle photographed by a camera provided in an apparatus for correcting an error of a radar sensor for a vehicle.

FIG. 3 is a view illustrating a front image of a vehicle photographed by a camera provided in an apparatus for correcting an error of a radar sensor for a vehicle according to one form of the present disclosure.

As shown in FIG. 3, it may be understood that a guardrail 310 is located at the left side of the road in the front image photographed by the camera 30. The guardrail 310 may be a reference for correcting a measurement error of the radar sensor 20.

Figure 4:
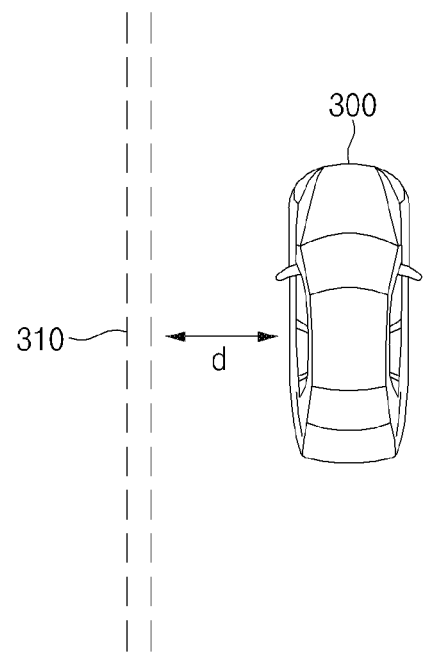
FIG. 4 is a view illustrating a guardrail detected in the front image of a vehicle by the controller provided in an apparatus for correcting an error of a radar sensor for a vehicle.

FIG. 4 is a view illustrating a guardrail detected in the front image of a vehicle by the controller provided in an apparatus for correcting an error of a radar sensor for a vehicle in one form of the present disclosure.

As shown in FIG. 4, the controller 40 may recognize the guardrail 310 in the front image of the vehicle as shown in FIG. 3 based on object recognition technology well-known in the art. In addition, the controller 40 may detect the separation distance (the horizontal distance between the vehicle and the guardrail) from the recognized guardrail 310.

Accordingly, as shown in FIG. 4, the controller 40 may generate a top view image indicating the positional relationship between a vehicle 300 and the guardrail 310 based on the shape of the guardrail 310 recognized from the front image of the vehicle photographed by the camera 30 and the separation distance 'd' from the guardrail 310. In this case, the vehicle 300 is a vehicle in which the apparatus 100 for correcting an error of a radar sensor for a vehicle according to one form of the present disclosure is installed.

Figure 5:
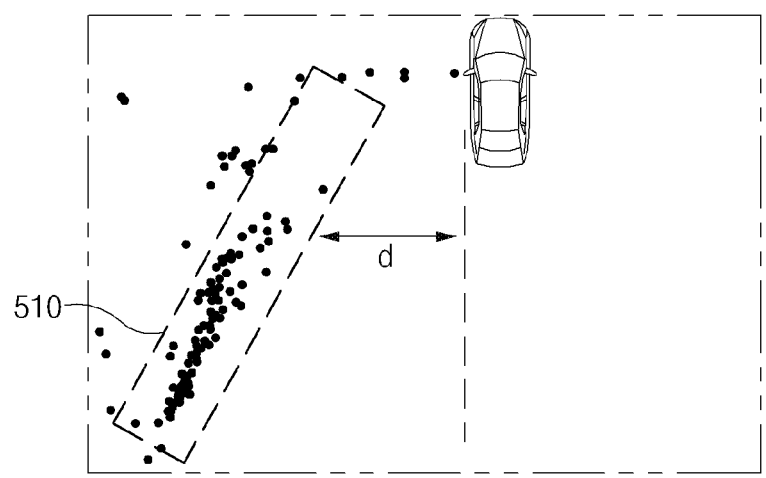
FIG. 5 is a view illustrating a guardrail detected by a radar sensor provided in an apparatus for correcting an error of a radar sensor for a vehicle.

FIG. 5 is a view illustrating a guardrail detected by a radar sensor provided in an apparatus for correcting an error of a radar sensor for a vehicle according to one form of the present disclosure.

As shown in FIG. 5, the radar sensor 20 installed inside the bumper of a vehicle may detect a tilted guardrail 510 rather than a normal vertical guardrail due to a difference in thickness of the bumper or deformation of the bumper surface.

Figure 6:
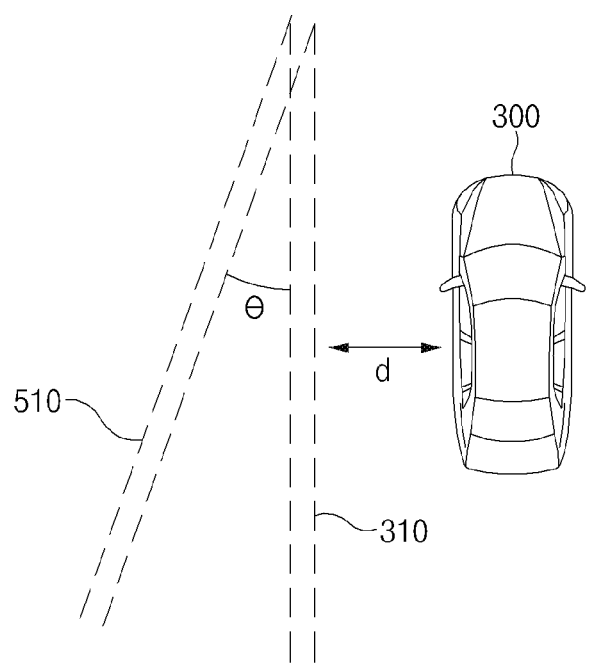
FIG. 6 is a view illustrating a case where a controller provided in an apparatus for correcting an error of a radar sensor for a vehicle mutually matches a guardrail on a top view image with a guardrail detected by the radar sensor.

FIG. 6 is a view illustrating a case where a controller provided in an apparatus for correcting an error of a radar sensor for a vehicle according to one form of the present disclosure mutually matches a guardrail on a top view image with a guardrail detected by the radar sensor.

First, the controller 40 determines whether the guardrail 310 on a top view image (hereinafter, referred to as a first guardrail) and guardrail 510 (hereinafter, referred to as a second guardrail) detected by the radar sensor 20 are identical with each other. That is, the controller 40 may determine the first and second guardrails 310 and 510 as the same target (guardrail) when the distance between the vehicle 300 and the first guardrail 310 and the distance between the vehicle 300 and the second guardrail 510 are within a critical range, and the shapes of the first and second guardrails 310 and 510 are included in the same category.

Thereafter, the controller 40 matches the positions of the first and second guardrails 310 and 510 with each other based on the vehicle 300 as shown in FIG. 6. In this case, the angle 'θ' between the first and second guardrails 310 and guardrail 510 represents a measurement error of the radar sensor 20. That is, the angle 'θ' represents the correction angle of the radar sensor 20.

Therefore, the controller 40 corrects the slope of the second guardrail 510 based on the first guardrail 310. That is, the controller 40 corrects the slope of the second guardrail 510 by the angle 'θ'. For the same reason, the position of the second guardrail 510 is corrected together.

Figure 7:
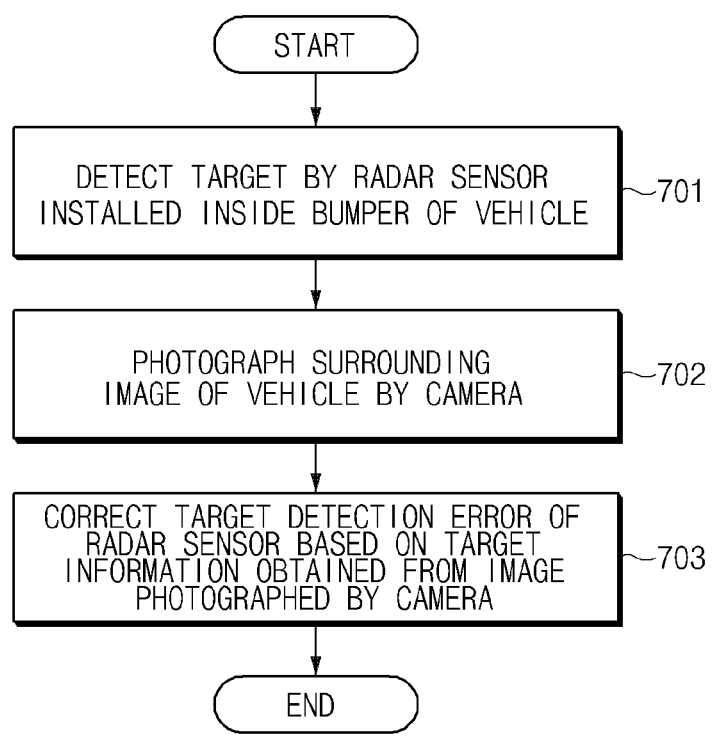
FIG. 7 is a flowchart illustrating a method of correcting an error of a radar sensor for a vehicle.

FIG. 7 is a flowchart illustrating a method of correcting an error of a radar sensor for a vehicle according to another form of the present disclosure.

First, in operation 701, the radar sensor 20 installed inside the bumper of the vehicle detects the target (701). That is, the radar sensor 20 measures the shape of a target and the separation distance from the target.

Then, in operation 702, the camera 30 photographs a surrounding image of the vehicle.

Thereafter, the controller 40 corrects a target detection error of the radar sensor 20 based on the target information obtained from the image photographed by the camera 30. That is, the controller 40 matches the position of the first guardrail 310 obtained from the image photographed by the camera 30 with the position of the second guardrail 510 detected by the radar sensor 20 based on the vehicle 300 and corrects the detection (measurement) error of the radar sensor 20 based on the angle between the first and second guardrails 310 and 510.

Figure 8:
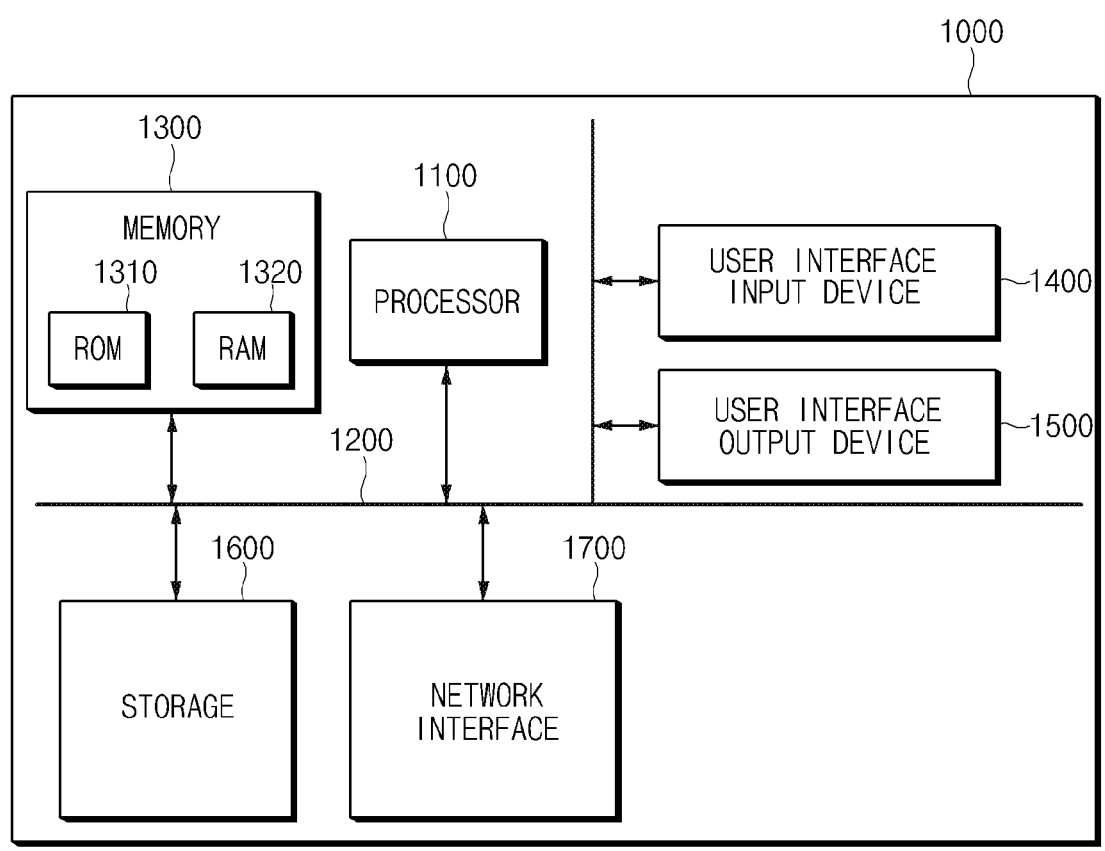
FIG. 8 is a block diagram illustrating a computing system for executing a method of correcting an error of a radar sensor for a vehicle.

FIG. 8 is a block diagram illustrating a computing system for executing a method of correcting an error of a radar sensor for a vehicle according to other form of the present disclosure.

Referring to FIG. 8, as described above, a method of correcting an error of a radar sensor for a vehicle according to one form of the present disclosure may be implemented with a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Accordingly, the processes of the method or algorithm described in relation to the forms of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the forms of the present disclosure, the apparatus for correcting an error of a radar sensor for a vehicle and the method thereof can correct a target measurement error of the radar sensor installed inside a bumper of the vehicle based on target information obtained from a camera image, such that the target measurement error of the radar sensor caused due to different bumper thicknesses or deformation of a bumper surface is corrected.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed forms of the present disclosure do not limit the technical spirit of the present disclosure but are illustrative, and the scope of the technical spirit of the present disclosure is not limited by the forms of the present disclosure. The scope of the present disclosure should be construed by the claims, and it will be understood that all the technical spirits within the equivalent range fall within the scope of the present disclosure.

What is claimed is:

1. An apparatus for correcting an error of a radar sensor for a vehicle, the apparatus comprising:
   the radar sensor installed inside a bumper of the vehicle and configured to detect a target;
   a camera configured to photograph a surrounding image of the vehicle; and
   a controller configured to:
      correct a target detection error of the radar sensor based on target information obtained from the surrounding image photographed by the camera,
      compare a shape of a first guardrail and a separation distance from the first guardrail obtained from the surrounding image with a shape of a second guardrail and a separation distance between the vehicle and the second guardrail detected by the radar sensor, and
      determine whether the first and second guardrails are the same.

2. The apparatus of claim 1, wherein the controller is further configured to:
   correct the target detection error of the radar sensor based on an angle between the first guardrail photographed by the camera and the second guardrail detected by the radar sensor, where the angle is calculated by matching a position of the first guardrail obtained by the camera with a position of the second guardrail detected by the radar sensor.

3. A method of correcting an error of a radar sensor for a vehicle, the method comprising:
   detecting a target by a radar sensor installed inside a bumper of the vehicle;
   photographing, by a camera, a surrounding image of the vehicle; and
   correcting, by a controller, a target detection error of the radar sensor based on target information obtained from the surrounding image photographed by the camera,
   wherein correcting the target detection error of the radar sensor includes:
      matching a position of a first guardrail obtained from the surrounding image photographed by the camera with a position of a second guardrail detected by the radar sensor; and
      correcting the target detection error of the radar sensor based on an angle between the first and second guardrails.

4. A method of correcting an error of a radar sensor for a vehicle, the method comprising:
   detecting a target by a radar sensor installed inside a bumper of the vehicle;
   photographing, by a camera, a surrounding image of the vehicle; and
   correcting, by a controller, a target detection error of the radar sensor based on target information obtained from the surrounding image photographed by the camera,
   wherein correcting the target detection error of the radar sensor includes:
      comparing, by the controller, a shape of a first guardrail and a separation distance from the first guardrail obtained from the surrounding image photographed by the camera with a shape of a second guardrail and a separation distance from the second guardrail detected by the radar sensor to determine whether the first and second guardrails are the same.

5. An apparatus for correcting an error of a radar sensor for a vehicle, the apparatus comprising:

a radar sensor installed inside a bumper of the vehicle and configured to measure a shape of a first guardrail and a separation distance from the first guardrail;

a camera installed on the vehicle and configured to photograph an image including a second guardrail; and a controller configured to correct a detection error of the radar sensor based on an angle between the first guardrail and the second guardrails which are generated by matching a position of the second guardrail obtained from the image photographed by the camera with a position of the first guardrail detected by the radar sensor.

6. The apparatus of claim 5, wherein the controller is configured to:

compare a shape of the second guardrail and a separation distance from the second guardrail obtained from the image photographed by the camera with a shape of the first guardrail and a separation distance from the first guardrail detected by the radar sensor, and determine whether the first and second guardrails are the same.

\* \* \* \* \*